United States Patent [19]
Dretzka

[11] 3,731,755
[45] May 8, 1973

[54] TURN AND BANK STEERING SYSTEM FOR SNOWMOBILES

[75] Inventor: Robert Dretzka, South Milwaukee, Wis.

[73] Assignee: Outboard Marine Corporation, Waukegan, Ill.

[22] Filed: Apr. 8, 1971

[21] Appl. No.: 132,440

[52] U.S. Cl. .................................................. 180/5 R
[51] Int. Cl. ..................................................B62m 27/02
[58] Field of Search......................................180/3–6; 280/21 R

[56] References Cited

UNITED STATES PATENTS

| | | | |
|---|---|---|---|
| 3,650,341 | 3/1972 | Asmussen | 180/5 R |
| 2,905,479 | 9/1959 | Schomers | 180/3 R X |
| 3,608,658 | 9/1971 | Woodfill | 180/5 R |
| 2,702,088 | 2/1955 | Klimek | 180/9.24 A |
| 3,550,706 | 12/1970 | Watkins | 180/5 R |
| 3,583,507 | 6/1971 | Trautwein | 180/5 R |
| 3,504,752 | 4/1970 | Milward | 180/5 R |

FOREIGN PATENTS OR APPLICATIONS

| | | | |
|---|---|---|---|
| 986,197 | 3/1951 | France | 180/5 |

*Primary Examiner*—Richard J. Johnson
*Attorney*—Robert E. Clemency, John W. Michael, Gerrit D. Foster, Bayard H. Michael, Paul R. Puerner, Joseph A. Gemignani, Andrew O. Riteris, Robert K. Gerling and Spencer B. Michael

[57] ABSTRACT

Disclosed herein is a snowmobile with a front cross bar having, at the opposite ends thereof, skis mounted for rotary movement relative to the cross bar about respective axes, and guide means mounting the cross bar on a frame for transverse movement along a path such that one ski is lowered and the other ski is raised in response to transverse movement of the cross bar in one direction and such that the other ski is lowered and the one ski is raised in response to transverse movement of the cross bar in the opposite direction. The disclosed snowmobile also includes a connection between a steering column and the cross bar for transversely displacing the cross bar in response to steering movement of the steering column, and connections between the frame and each of the skis to provide common swinging of the skis about respective generally upright axes in response to transverse cross bar movement.

8 Claims, 4 Drawing Figures

Inventor
Robert Dretzka
By Robert E. Clemency
Attorney

Patented May 8, 1973

Inventor
Robert Dretzka
By
Robert E. Clemency,
Attorney

TURN AND BANK STEERING SYSTEM FOR SNOWMOBILES

BACKGROUND OF THE INVENTION

The invention relates generally to snowmobiles and more particularly to snowmobiles including arrangements for effecting common turning of the runners or skis about respective steering axes in response to steering actuation of a steering column and for changing the vertical distance of the runners with respect to the snowmobile frame in opposite directions during turning of the runners about their steering axis. One such arrangement is disclosed in the Watkins U.S. Watkins Pat. No. 3,550,706, issued Dec. 29, 1970.

SUMMARY OF THE INVENTION

The invention provides a snowmobile including a cross bar which, at its ends, rotatably supports a pair of skis or runners and which is mounted on the snowmobile frame and connected to a steering column so that, in cooperation with connection of the skis to the frame, transverse movement of the cross bar caused by steering actuation of a steering column serves to effect a common steering movement of the skis, as well as opposite vertical movement of the skis relative to the snowmobile frame.

In one particular embodiment in accordance with the invention, the cross bar includes a central portion and opposite end portions each including upper and lower surfaces. The frame includes first guide means limiting the cross bar to transverse movement, second guide means engaging the upper surface of each of the cross bar end portions, and yieldable means engaged with the lower surfaces of the cross bar end portions to maintain engagement of the second guide means and the upper cross bar end portion surfaces, whereby transverse shifting of the cross bar serves to raise one end portion and to lower the other end portion.

Also in accordance with the invention, the respective end portions of the cross bars have fixed thereon sleeves which rotatably support ski posts connected to the skis and fixed against material axial movement relative to the sleeves. In turn, the ski posts are connected through steering arms and tie rods to the snowmobile frame so that transverse cross bar movement causes common rotation of the skis relative to the cross bar.

In order to obtain transverse cross bar movement, the cross bar is connected by a tie bar and through a steering bracket to a steering column which is thereby operable to shift the cross bar transversely upon rotation of the steering column.

The principal object of the invention is to provide a snowmobile with a ski supporting cross bar which is transversely movable to effect common rotary movement of the skis and concurrent opposite vertical movement of the skis relative to the frame in response to steering actuation of the snowmobile. This allows the vehicle to bank in the direction into which it is turned and significantly improves its maneuverability and safety.

Another principal object of the invention is the provision of a snowmobile which includes a steering arrangement affording common rotation of a pair of skis, as well as accompanying opposite vertical movement in response to steering actuation of the snowmobile, which is economical to manufacture, and which will provide reliable service over a long and useful life.

Other objects and advantages of the invention will become known by reference to the following description and the accompanying drawings.

DRAWINGS

GENERAL DESCRIPTION

Figure 1:
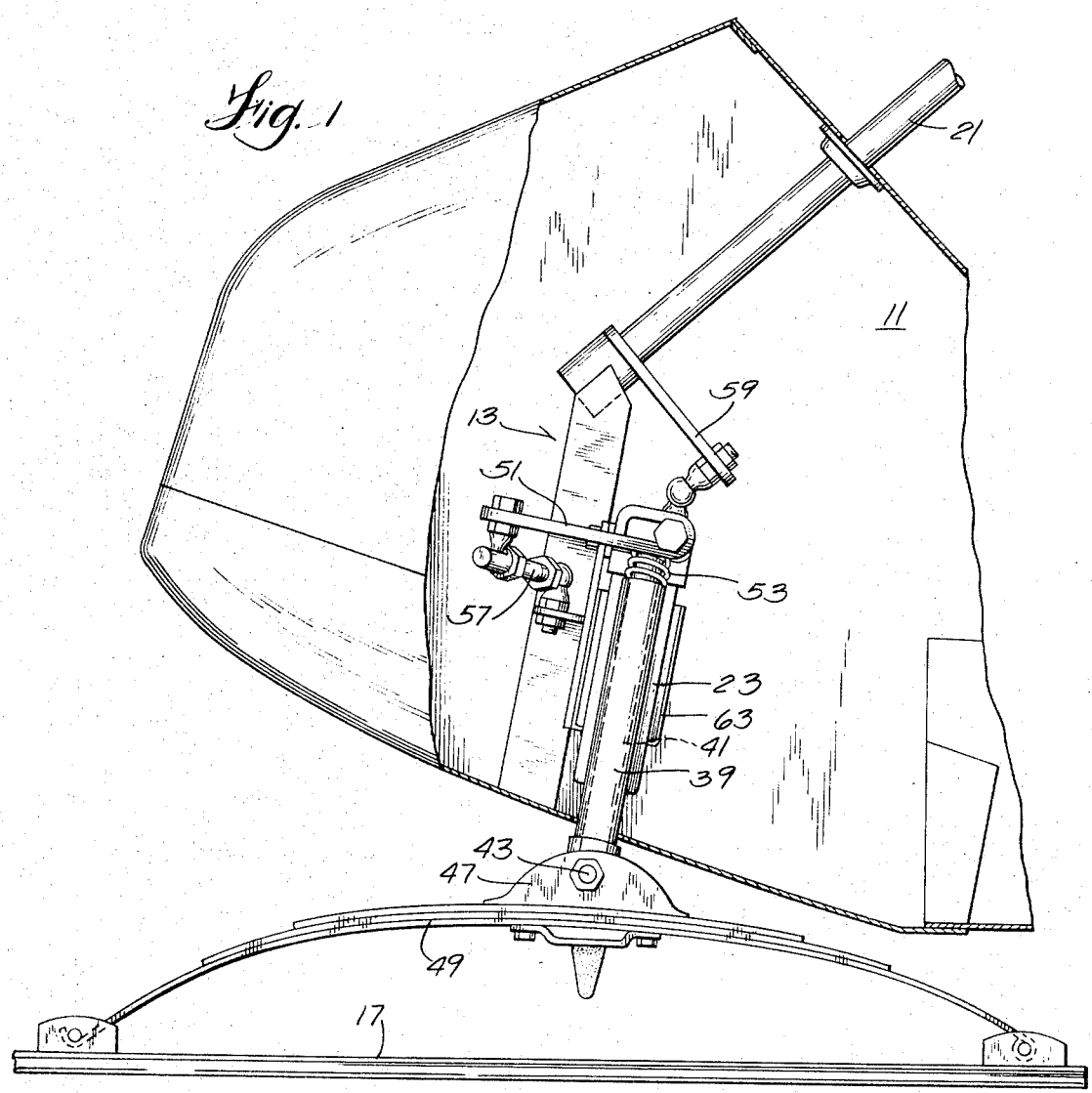
FIG. 1 is a fragmentary side elevational view, with parts broken away, of one embodiment of a snowmobile embodying various of the features of the invention
Figure 4:
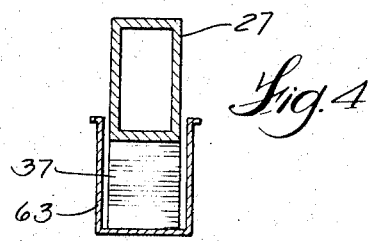
FIG. 4 is a sectional view taken along line 4—4 of FIG. 3.
Figure 2:
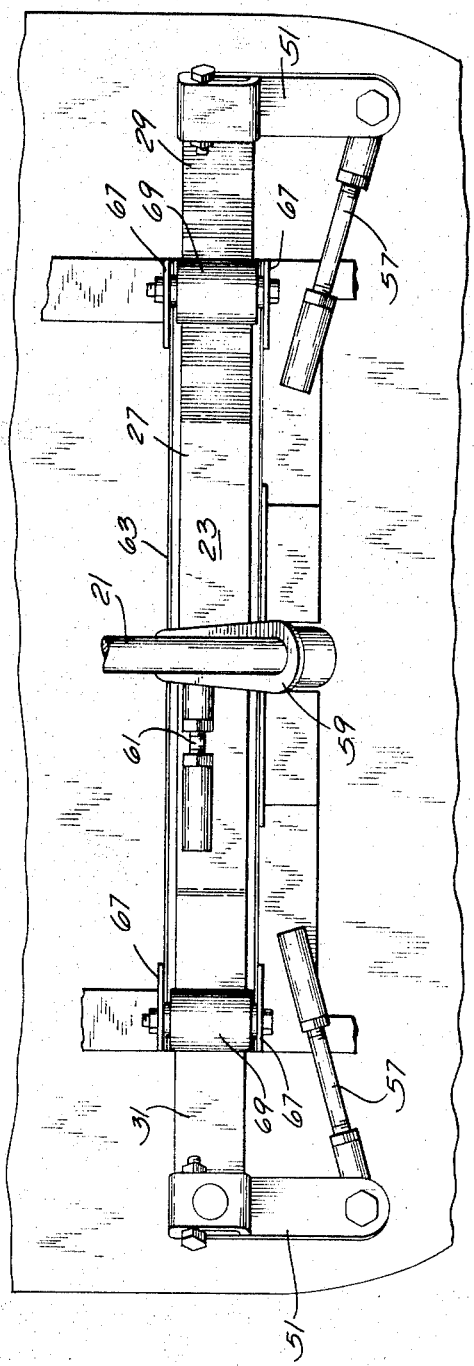
FIG. 2 is a fragmentary top elevational view of the structure shown in FIG. 1.
Figure 3:
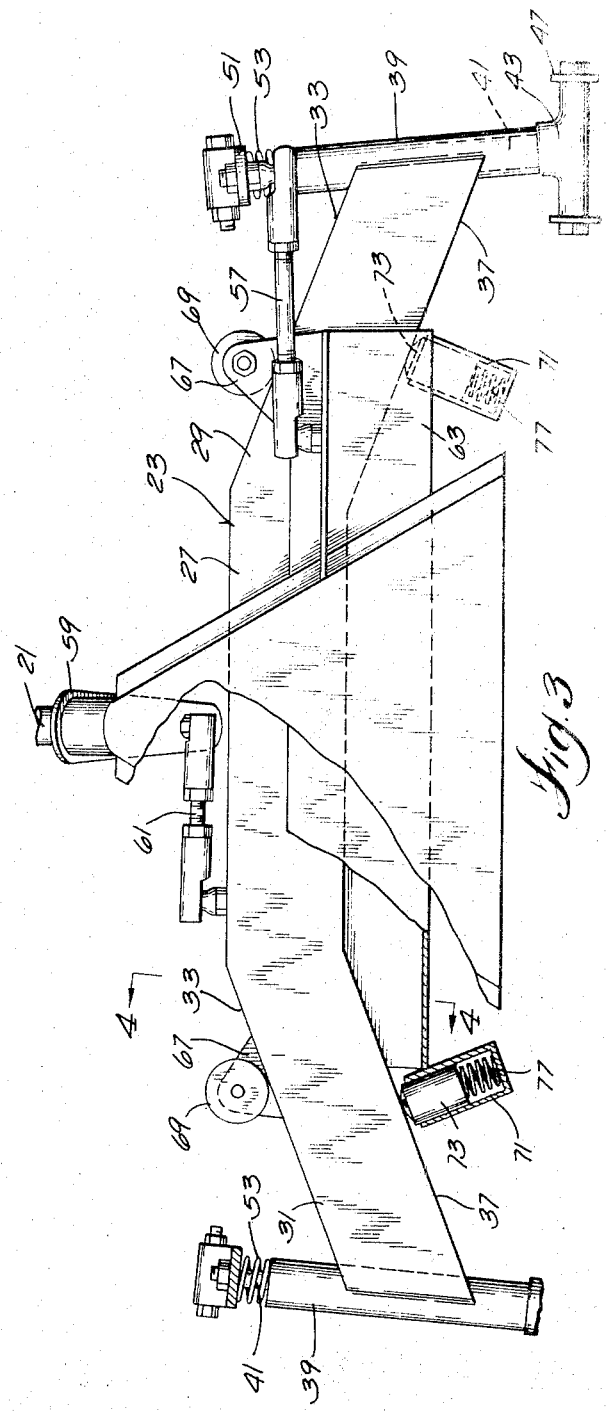
FIG. 3 is a fragmentary front elevational view, with parts broken away and in section, of the structure shown in FIG. 1.

Shown in the drawings is a snowmobile 11 which embodies various of the features of the invention and which, as is conventional, includes a frame 13 and a pair of forwardly located skis or runners 17 which support the frame 13 and which are steerable to cause snowmobile turning. As is also conventional, the snowmobile 11 includes a steering column 21 which is rotatably mounted on the frame 13 and operable by a pair of handle bars (not shown).

In accordance with the invention, the skis 17 are rotatably supported for common steering movement and for opposite vertical movement relative to the frame during steering movement by means including a cross bar or member 23 which is mounted on the frame 13 for transverse movement.

More particularly, while other constructions could be employed, in the disclosed construction, the cross bar or beam 23 comprises a central portion 27 and oppositely extending end portions 29 and 31 including upper and lower surfaces 33 and 37 which extend outwardly and downwardly. In the specifically disclosed construction, such upper and lower surfaces 33 and 37 extend in generally parallel relation to each other.

Means are provided at each of the ends of the cross bar 23 for rotatably mounting one of the skis 17 and 19 for steering movement about an axis which is generally upright. While other constructions could be employed, as shown in the drawings, respective tubes or sleeves 39 are fixedly secured to the ends of the cross bar end portions 29 and 31, which tubes or sleeves 39 respectively rotatably receives ski posts 41 extending upwardly from respective horizontal transverse pivotal connections 43 with respective brackets 47 supporting respective leaf spring assemblies 49 which, in turn, are respectively connected to the ski 17.

Means are provided for preventing material axial movement of the ski posts 41 relative to the sleeve 39 and cross bar 23, while at the same time, providing for steering movement of the skis 17 in response to transverse movement of the cross bar 23. While other constructions can be employed, in the disclosed construction, such means includes respective steering arms 51 which are suitably fixedly attached to the tops of the respective skis posts 41 to cause ski post steering movement in response to steering arm swinging movement, as well as respective helical springs 53 which encircle a part of the respective ski posts 41 and which seat between the upper end of the respective sleeves 39 and the respective steering arms 51. Accordingly, the springs 53 bias the ski posts 41 upwardly, thereby effectively eliminating material vertical movement of the ski 17 relative to the cross bar 23.

As already indicated, means are provided for effecting common turning or steering movement of the skis 17 in response to transverse movement of the cross bar 23. While other constructions could be employed, in the disclosed construction, such means includes connection of the before mentioned steering arms 51 to respective tie rods 57 which, in turn, are connected to the frame 13. The connections of the tie rods 57 to the frame 13 and to the steering arms 51 are made in such a manner as to accommodate pivotal movement between the tie rods 57, the frame 13 and the steering arms 51 occurring consequent to the transverse movement of the cross bar 23.

Means are provided for causing transverse movement of the cross bar 23 in response to rotation of the steering column 21. While various other constructions can be employed, in the disclosed construction, such means includes a steering bracket 59 fixed to the steering column 21 and connected to a tie bar 61 which, in turn, is connected to the central portion 27 of the cross bar 23. The connection of the tie bar 61 to the steering bracket 59 and to the cross bar 23 is such as to permit pivotal movement between the tie bar 61 and the steering bracket 59 and the cross bar 23 occurring consequent to steering actuation of the steering column 21. From the foregoing, it is apparent that rotation of the steering column 21 will cause the cross bar 23 to move transversely of the frame.

Means are provided for mounting the cross bar 23 on the frame 13 for guiding movement in a transverse direction such that, in response to transverse movement in one direction, one end of the cross bar 23 and the associated ski 17 is lowered and the other end of the cross bar and associated ski 17 is raised and, such that, in response to transverse displacement of the cross bar 23 in the other direction, the other end of the cross bar 23 and accompanying ski 17 is lowered and the one end of the cross bar and accompanying ski 17 is raised. Thus, the steering column 21 is operable to transversely move the cross bar 23 and, as a consequence of such transverse movement, one ski is raised and the other ski is lowered, depending upon the direction of cross bar movement. At the same time, because of the connection to the frame of the steering posts 41 extending from the skis 17, transverse movement of the cross bar 23 causes common rotative movement of the skis 17.

While various constructions can be employed to provide means for guiding transverse movement of the cross bar 23 on the frame 13, in the disclosed construction, such means includes means limiting movement of the cross bar 23 to movement transversely of the frame 13 of the snowmobile. While various constructions can be employed, in the disclosed construction, such means comprises incorporation in the frame 13 of an upwardly open channel shaped beam 163 which receives the central portion 27 of the cross bar 23, whereby to limit movement of the cross beam to transverse movement while nevertheless affording vertical shifting of the cross bar 23.

The means for guiding transverse cross bar movement also includes second guide means which engage the upper surfaces 33 of the cross bar end portions 29 and 31 to assist in guiding vertical shifting movement of the cross bar 23 such that one end of the cross bar 23 is raised and the other end lowered in response to transverse cross bar movement. While various constructions can be employed, in the disclosed construction, there is provided, at each side, brackets 67 which extend upwardly from the frame 13 and which, at each side, support respective rollers 69 engaged with the upper surfaces 33 of the cross bar end portions 29 and 31.

The means for guiding transverse movement of the cross bar 23 so as to raise one end and lower the other end in response to transverse cross bar movement further includes third means operable to maintain engagement between the rollers 69 and the upper surfaces 33 of the cross bar end portions 29 and 31. While various constructions can be employed, in the disclosed construction, such means comprises formation on the frame 13 and at each side thereof, of respective pockets or sockets 71 which receive respective support blocks or pads 73 and which include, between the supporting pads 73 and the socket bottoms, respective helical compression springs 77 which serve to urge the pads 73 outwardly of the sockets 71 and into engagement with the lower surfaces 37 of the adjacent cross bar end portions 17 and 19. Thus, the springs 77, cooperate with the pads 73 to insure that the end portions 29 and 31 of the cross bar 23 are urged upwardly into engagement with the rollers 69. Because of the shape of the cross bar 23, when the cross bar 23 is transversely shifted, one cross bar end is raised and the other end is lowered depending upon the direction of transverse shifting.

In operation, the operator of the snowmobile 11 need only steer the handle bars (not shown) to cause the skis 17 to turn in common and to cause one ski to move toward the frame and to cause the other ski to move away from the frame and thereby to bank the snowmobile into the direction of the turn. In this regard, as already explained, the steering column 21 is connected by the tie bar 57 to the cross bar 23 to effect transverse shifting of the cross bar 23 in response to rotation of the steering column 21 by the handle bars. Such transverse cross bar movement causes one of the ski 17 to be elevated and the other ski 17 to be lowered and, at the same time, because of the connection of the tie rods 57 between the frame 13 and the ski posts 41, causes common rotative movement of the skis 17.

Various of the features of the invention are set forth in the following claims.

What is claimed is:

1. A snow vehicle comprising a frame, first and second runner for supporting said frame above a surface, a steering column supported on said frame, and means for common turning of said runners about respective steering axes and for changing the vertical distance of said runners from said frame in opposite directions relative to said frame during turning of said runners about said steering axes in response to steering actuation of said steering column, said means including a cross bar, means on said frame guiding and supporting said cross bar for lateral movement transverse to said frame and for opposite vertical movement of the cross bar ends in response to transverse cross bar movement, means connecting said steering column to said cross bar for transversely moving said cross bar in response to steering column movement, and means at each end of said cross bar for respectively vertically supporting one of said runners relative to said cross bar and for respectively journaling the associated one of said runners for turning movement relative to said cross bar with said respective steering axes being stationarily fixed relative to said cross bar.

2. A snow vehicle in accordance with claim 1, wherein said means for common turning of said runners includes means connected between said runners and said frame for turning said runners in response to transverse cross bar movement.

3. A snowmobile comprising a frame, a steering column rotatably mounted on said frame, a pair of skis, a cross bar and means on said cross bar vertically supporting and rotatably mounting one of said skis at each of the opposite ends of said cross bar to provide common vertical movement of said skis and cross bar ends and to permit rotary movement of said skis relative to said cross bar about respective steering axes stationarily fixed relative to said cross bar, means supporting said cross bar on said frame with said steering axes extending generally upright and for guiding said cross bar for lateral transverse movement relative to said frame along a path such that one end of said cross bar is lowered and the other end of said cross bar is raised in response to lateral transverse movement of said cross bar in one direction and such that the other end of said cross bar is raised in response to lateral movement of said cross bar in the direction opposite to said one direction, means connected between said steering column and said cross bar for laterally transversely displacing said cross bar along said path in response to steering movement of said steering column, and means operatively connected between said frame and each of said skis for effecting swinging of each of said skis in the same rotative direction about said generally upright steering axes in response to lateral transverse movement of said cross bar.

4. A snowmobile in accordance with claim 3 wherein said means on said cross bar mounting said skis comprises sleeves respectively fixed to the ends of said cross bar and ski posts extending from said skis and rotatably extending through said sleeves, and means preventing material axial movement of said ski posts relative to said sleeves.

5. A snowmobile in accordance with claim 4 wherein said means connected between said frame and each of said skis comprises a steering arm fixed to each of said ski posts and a tie rod connected to each of said steering arms and said frame, whereby transverse movement of said cross bar causes common rotation of said ski posts in said sleeves.

6. A snowmobile in accordance with claim 2 wherein said cross bar includes opposite end portions each having upper and lower surfaces extending outwardly and downwardly and wherein said means supporting and guiding said cross bar comprises a first guide on said frame for limiting movement of said cross bar to lateral transverse movement, second guides on said frame respectively engaging one of said upper and lower surfaces of each of said cross bar end portions, and yieldable means on said frame engaging the other of said upper and lower surfaces of each of said cross bar end portions for maintaining said one surfaces in engagement with said second guides during lateral movement of said cross bar.

7. A snowmobile in accordance with claim 6 wherein said cross bar includes a central portion between said end portions, and wherein said means connected between said steering column and said cross bar includes a steering bracket fixed to said steering column and a tie bar connected to said cross bar central portion and to said steering bracket.

8. A snowmobile comprising a frame, a steering column rotatably mounted on said frame, a pair of skis, a cross bar including a central transversely and horizontally extending portion and opposite end portions having upper and lower surfaces extending outwardly and downwardly from said central portion sleeves respectively fixed to the cross bar end portions, ski posts extending from said skis and extending rotatably through said sleeves, means preventing material axial movement of said ski posts relative to said sleeves, a first guide on said frame limiting movement of said cross bar to transverse movement, second guides on said frame respectively engaging one of said upper and lower surfaces of each of said cross bar end portions, and yieldable means on said frame engaging the other of said upper and lower surfaces of each of said cross bar end portions for maintaining said one surfaces in engagement with said second guides during transverse movement of said cross bar, a steering bracket fixed to said steering column, a tie bar connected to said cross bar central portion and to said steering bracket, whereby to displace said cross bar transversely in response to steering movement of said steering column, a steering arm fixed to each of said ski posts, and a tie rod connected to each of said steering arms and to said frame, whereby transverse movement of said cross bar causes common rotation and opposite vertical movement of said skis.

* * * * *